(12) United States Patent
Bucher et al.

(10) Patent No.: US 10,669,983 B2
(45) Date of Patent: Jun. 2, 2020

(54) AXIAL PISTON MACHINE

(71) Applicant: Mahle International GmbH, Stuttgart (DE)

(72) Inventors: Michael Bucher, Berlin (DE); Christoph Fiala, Potsdam (DE); Mirko Guenther, Berlin (DE); Michael Hoetger, Berlin (DE); Falk Schneider, Korntal-Muechingen (DE)

(73) Assignee: Mahle International GmbH (DE)

( * ) Notice: Subject to any disclaimer, the term of this patent is extended or adjusted under 35 U.S.C. 154(b) by 299 days.

(21) Appl. No.: 15/557,117

(22) PCT Filed: Feb. 17, 2016

(86) PCT No.: PCT/EP2016/053370
§ 371 (c)(1),
(2) Date: Sep. 10, 2017

(87) PCT Pub. No.: WO2016/142141
PCT Pub. Date: Sep. 15, 2016

(65) Prior Publication Data
US 2018/0045172 A1  Feb. 15, 2018

(30) Foreign Application Priority Data
Mar. 11, 2015  (DE) .......... 10 2015 204 367

(51) Int. Cl.
*F04B 1/14* (2020.01)
*F03C 1/32* (2006.01)
(Continued)

(52) U.S. Cl.
CPC .......... *F03C 1/0626* (2013.01); *F01B 3/0002* (2013.01); *F01B 3/0017* (2013.01);
(Continued)

(58) Field of Classification Search
CPC .. F01B 3/0002; F01B 3/3002; F01B 3/30029; F01B 3/0008; F04B 1/122; F04B 1/14; F04B 1/143
See application file for complete search history.

(56) References Cited

U.S. PATENT DOCUMENTS 2,674,197 A  4/1954  Dudley
3,011,452 A  12/1961  Budzich
(Continued)

FOREIGN PATENT DOCUMENTS

DE  19754593 A1  7/1999
DE  102010036917 A1  2/2012
(Continued)

OTHER PUBLICATIONS

English abstract for JP-2005-163580.
(Continued)

*Primary Examiner* — Patrick Hamo
(74) *Attorney, Agent, or Firm* — Fishman Stewart PLLC

(57) ABSTRACT

An axial piston machine may include a rotor with a shaft. A plurality of cylinders may be arranged in an annular manner about the shaft. A plurality of pistons may each be positioned within each of the plurality of cylinders and may be constructed and arranged to move translationally within the plurality of cylinders. A cylinder head may include a plurality of inlet openings and may be in operative communication with the plurality of cylinders. A sealing washer having a plurality of passage openings may be disposed on the cylinder head so that the plurality of passage openings and the plurality of inlet openings may be flush with one another. A number of the plurality of inlet openings may correspond to a number of the plurality of passage openings. A valve plate may be connected to the shaft in a rotationally fixed manner and may be constructed and arranged to be brought into congruence with the plurality of passage openings.

(Continued)

ings of the sealing washer based on a rotary angle. The sealing washer may be disposed between the plurality of inlet openings and the valve plate and may be prestressed against the cylinder head and onto the inlet openings.

20 Claims, 2 Drawing Sheets

(51) Int. Cl.
| | | |
|---|---|---|
| F04B 1/143 | (2020.01) | |
| F01B 3/00 | (2006.01) | |
| F04B 1/188 | (2020.01) | |
| F04B 53/10 | (2006.01) | |
| F16K 3/02 | (2006.01) | |
| F16K 3/08 | (2006.01) | |

(52) U.S. Cl.
CPC .............. *F04B 1/143* (2013.01); *F04B 1/188* (2013.01); *F04B 53/1087* (2013.01); *F16K 3/0227* (2013.01); *F16K 3/085* (2013.01)

(56) References Cited

U.S. PATENT DOCUMENTS

| | | | | |
|---|---|---|---|---|
| 4,003,968 A * | 1/1977 | Rickert | ................. | F02M 17/04 |
| | | | | 261/35 |
| 4,181,067 A | 1/1980 | Ortelli | | |
| 4,752,190 A * | 6/1988 | Fry | .................... | F04B 39/1066 |
| | | | | 29/407.05 |
| 6,425,314 B1 | 7/2002 | Kleinedler et al. | | |
| 7,493,913 B2 * | 2/2009 | Hamza | ............... | A61H 33/6073 |
| | | | | 137/514 |
| 7,632,077 B2 * | 12/2009 | Tagami | ............... | F04B 27/1009 |
| | | | | 285/379 |
| 7,859,168 B2 * | 12/2010 | Banister | ............... | F04B 19/006 |
| | | | | 310/311 |
| 7,862,307 B2 * | 1/2011 | Watanabe | ........... | F04B 27/1081 |
| | | | | 417/269 |
| 7,972,118 B2 * | 7/2011 | Hirabayashi | ........ | F04B 27/1072 |
| | | | | 417/269 |
| 7,972,119 B2 * | 7/2011 | Ozeki | ................. | F04B 27/1036 |
| | | | | 417/222.1 |
| 8,727,742 B2 * | 5/2014 | Lee | ........................ | F04B 1/2042 |
| | | | | 417/222.1 |
| 10,280,905 B2 * | 5/2019 | Eggler | ..................... | F04B 1/12 |
| 2005/0147507 A1 * | 7/2005 | Makino | ................... | F01B 3/002 |
| | | | | 417/375 |
| 2013/0318967 A1 * | 12/2013 | Gaertner | ............... | F01K 23/065 |
| | | | | 60/615 |
| 2015/0086399 A1 * | 3/2015 | Rabhi | ................... | F04B 53/143 |
| | | | | 417/437 |
| 2018/0045173 A1 * | 2/2018 | Bucher | .................. | F01B 3/101 |

FOREIGN PATENT DOCUMENTS

| | | |
|---|---|---|
| DE | 102011118622 A1 | 5/2013 |
| DE | 102013213614 A1 | 1/2015 |
| EP | 2098702 A1 | 9/2009 |
| GB | 552547 A | 4/1943 |
| JP | 2005-163580 A | 6/2005 |

OTHER PUBLICATIONS

English abstract for DE-102010036917.
English abstract for DE-102013213614.
English abstract for DE-102011118622.

\* cited by examiner

AXIAL PISTON MACHINE

CROSS-REFERENCE TO RELATED APPLICATIONS

This application claims priority to International Application No. PCT/EP2016/053370, filed on Feb. 17, 2016, and German Patent Application No. DE 10 2015 204 367.3, filed on Mar. 11, 2015, the contents of which are hereby incorporated by reference in their entirety.

TECHNICAL FILED

The invention at hand relates to an axial piston machine with a shaft. The invention furthermore relates to a heat recovery system with such an axial piston machine.

BACKGROUND

It is known in the case of internal combustion engines that only 40% of the energy stored in the fuel is used to move the piston and thus to drive the internal combustion engine. The remaining energy generated in the context of the combustion is predominantly discharged from the internal combustion engine in the form of heat through escaping combustion exhaust gases. To reduce such heat losses and thus also to increase the efficiency of the internal combustion engine, it is known to couple an axial piston machine to the internal combustion engine.

For example a generic axial piston machine with a shaft, which is coupled to a swash plate in a rotationally fixed manner, is known from DE 10 2011 118 622 A1. A plurality of cylinders, in which pistons are in each case arranged so that they can be moved translationally, are thereby arranged coaxially to the shaft and in an annular manner around the latter. Each of these pistons is coupled to the swash plate via a corresponding spherical bearing and a sliding block, whereby a movement of the respective piston effects a drive of the swash plate and thus a driving of the shaft. Each inlet opening of a cylinder is thereby swept once in response to each rotation via a control plate comprising an eccentrically arranged passage opening, and working medium is thereby supplied to the respective cylinder. Provision is made in the central area of the axial piston machine around the shaft for a cavity, which is defined by the control plate, wherein the outlet openings, which belong to the cylinders, are guided through the cylinder head in such a way that a temporary connection between the cavity and the expansion volume of the cylinder can be established via the off-axis passage opening of the circumferential control plate. In particular the efficiency is to be capable of being increased through this.

In general, axial piston machines, in which a compressed medium, which is evaporated by exhaust gas, expands and thus creates mechanical energy, are used in heat recovery systems. In order to thereby be able to attain the highest possible efficiency, it must be ensured that only one of the cylinders is in fact filled, while the other inlet openings of the remaining cylinders are closed in an absolutely tight manner. Due to the fact that a rotating valve plate, which has a valve opening, is typically used as inlet control valve, a sealing must thus take place at a circumference of this valve plate. The sealing hereby typically takes place via so-called slightly raised "sealing eyes", which surround the inlet openings in an annular manner and are thus also called sealing rings.

Due to the fact that an axial piston machine represents a thermally highly-stressed system and due to the fact that a housing thereof as well as a cylinder head can heat up to varying extents during operation, different axial expansions can occur, which, in the extreme case, leads to a bulging of the cylinder head and, associated therewith, to a lifting of the valve plate off the sealing eyes, thus resulting in leakages, which reduce the efficiency.

The invention at hand thus deals with the problem of specifying an improved or at least an alternative embodiment, which has an increased efficiency in particular due to an improved seal, for an axial piston machine of the generic type.

According to the invention, this problem is solved by means of the subject matter of the independent claim(s). Advantageous embodiments are the subject matter of the dependent claims.

SUMMARY

The invention at hand is based on the general idea of prestressing a sealing washer for sealing individual inlet openings of individual cylinders of an axial piston machine with respect to a rotating valve plate against a cylinder head of the axial piston machine and to the inlet openings, whereby a bulging or another deformation of the sealing washer, respectively, based on different temperature-related axial expansions, for example, can be avoided and a flat sealing surface to the valve plate can thus be ensured, which can be sealed significantly more easily. The axial piston machine according to the invention thereby has a rotor with a shaft as well as cylinders, which are arranged in an annular manner about and at an angle to the shaft and in which pistons are arranged such that they can be moved translationally. The cylinders are thereby arranged in a range of +/−30° to the rotor, in particular 0°, thus parallel to the rotor. An axis of the cylinders, which are arranged in an annular manner, thereby runs coaxially to the shaft. Each cylinder is thereby assigned an inlet opening in a cylinder head. According to the invention, provision is now made for a sealing washer, which has a number of passage openings, which corresponds to the number of inlet openings, and which is arranged on the inlet openings in such a way that the passage openings of the sealing washer and the inlet openings of the cylinders are arranged flush with one another. The sealing washer is thereby connected to the cylinder head in a rotationally fixed manner, so that the passage openings are always arranged flush with the inlet openings of the cylinders. Provision is furthermore made for a valve plate, which is connected to the shaft in a rotationally fixed manner and which comprises a single valve opening, which can be brought into congruence with the individual passage openings of the sealing washer in a manner, which is dependent on the rotary angle, and, depending on the rotational position, thus makes it possible for working medium to flow into the respective cylinder, while all other cylinders are closed by the sealing washer. In order to now be able to effect a reliable sealing of the individual cylinders, the sealing washer arranged between the inlet openings and the valve plate is prestressed against the cylinder head and onto the inlet openings in accordance with the invention. This can either take place in that the sealing washer is prestressed against the cylinder head and onto the inlet openings by means of a holding-down device, which is screwed to the cylinder head, or in that the sealing washer is screwed directly to the cylinder head. Such a holding-down device can for example be embodied in the manner of a metal sheet star and prevents a deformation of the sealing washer. However, both embodiments thereby have in common that a pressing of the sealing washer onto the cylinder head and thus a sealing in the area of the inlet openings into the cylinders can be attained through this, whereby a particularly high efficiency can be attained. In response to the fixation of the sealing washer on the cylinder head, it is furthermore particularly advantageous that even in the case of a temperature-related or pressure-related deformation and in particular bulging of the cylinder head, the sealing washer remains as tightly as possibly on the inlet openings. The lift-off of the sealing washer is reduced, because the sealing washer is not supported close to the axis, but in the direct vicinity of the inlet openings. This results in a significantly reduced leakage.

In the case of an advantageous further development of the solution according to the invention, the sealing washer has the sealing rings, which surround the respective passage openings and which face the valve plate and which are in sliding contact with the latter. The sealing rings are hereby commonly also referred to as sealing eyes. The valve plate thus slides across the sealing rings and seals the passage openings and the inlet openings, which are flush therewith, into the cylinders, provided that the valve opening in the valve plate does not sweep over the respective passage opening of the sealing washer.

In the case of an advantageous further development of the solution according to the invention, the sealing washer is at least partially made of a carbonaceous material or the sealing washer is made of metal and the sealing rings are made of a carbonaceous material. Carbon thereby represents a material, which is finely wearable, which also makes it possible that the valve plate exposes an ideally narrow gap with a maximum sealing effect by means of grinding. It goes without saying that a different sealing and temperature-resistant material, such as for example a plastic, in particular polytetrafluoroethylene (PTFE), could also be used instead of the carbonaceous material.

In the case of an advantageous further development of the solution according to the invention, the sealing washer is prestressed against the cylinder head and onto the inlet openings by means of a holding-down device, wherein the holding-down device has radial arms, which are prestressed in the circumferential direction between the passage openings against the sealing washer and which push the latter against the cylinder head. In the case of this embodiment, which is an alternative to the direct screwing of the sealing washer to the cylinder head, the sealing washer is fixed to the cylinder head by means of the holding-down device, wherein the radial arms thereof provide for an at least a slight tolerance compensation, depending on the stiffness. The holding-down device with its radial arms can thereby be embodied as cost-efficient and temperature-resistant punched sheet metal part and can be screwed to the cylinder head by means of screws, i.e. through the sealing washer. It is conceivable in this case that the sealing washer is embodied in an annular manner and that the screws pierce the sealing washer inside the ring.

Advantageously, the valve opening in the valve plate is embodied in a ring segment-shaped manner and has convex side walls. In the case of a particularly preferred embodiment of the solution according to the invention, a radius of the convex side walls thereby corresponds to a radius of the passage openings in the sealing washer. When the valve opening sweeps over the passage opening, a comparatively quick, in particular even an abrupt opening and closing of the passage openings or inlet openings, respectively, into the respective cylinder can be attained through this, whereby an abrupt application of the respective piston with steam or with the used working medium, respectively, takes place.

The invention at hand is further based on the general idea of equipping a heat recovery system in a motor vehicle with such an axial piston machine. Such a heat recovery system can for example use the exhaust gas, which is ejected from an internal combustion engine and which is very hot, to heat or to vaporize, respectively, a working medium, wherein this medium subsequently expands in the axial piston machine and drives it and thus converts the energy of the hot exhaust gas into mechanical energy.

Further important features and advantages of the invention follow from the subclaims, from the drawings and from the corresponding description of the figures by means of the drawings.

It goes without saying that the above-mentioned features and the features, which will be explained below, cannot only be used in the respectively specified combination, but also in other combinations, or alone, without leaving the scope of the invention at hand.

Preferred exemplary embodiments of the invention are illustrated in the drawings and will be explained in more detail in the description below, whereby the same reference numerals refer to the same or to similar or to functionally identical components.

BRIEF DESCRIPTION OF THE DRAWINGS

In each case schematically.

DETAILED DESCRIPTION

Figure 1:
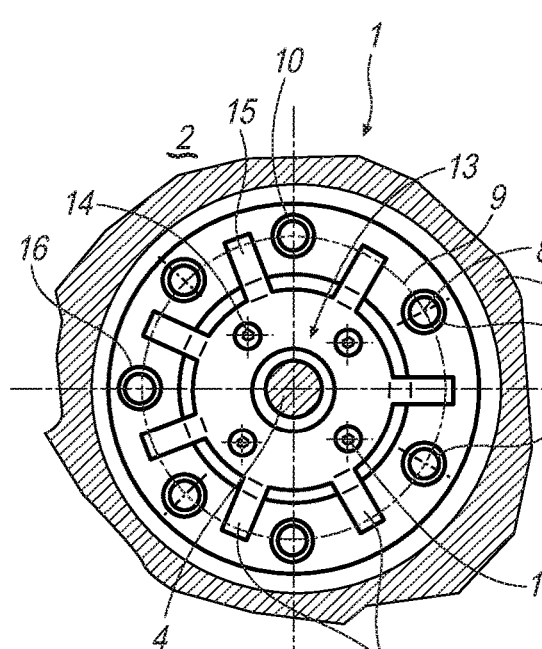
FIG. 1 shows a front view onto an axial piston machine according to the invention.
Figure 2:
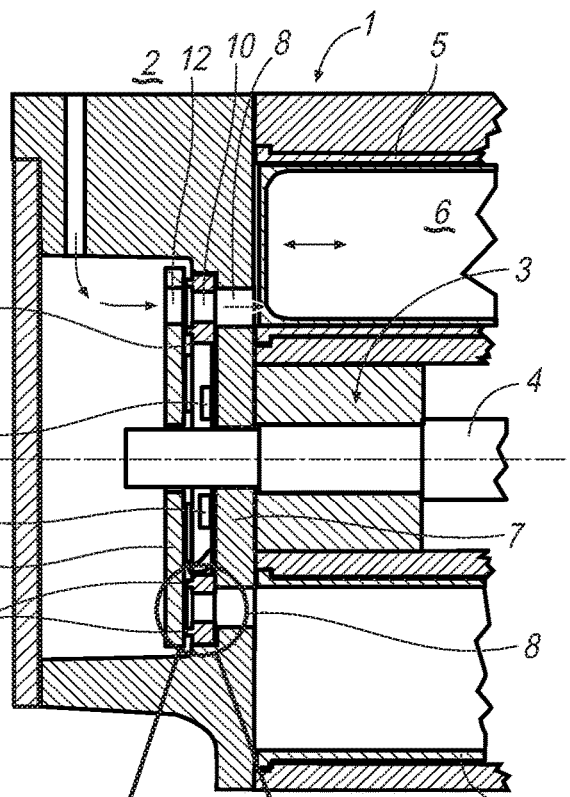
FIG. 2 shows a sectional illustration through the axial piston machine according to the invention.
Figure 6:
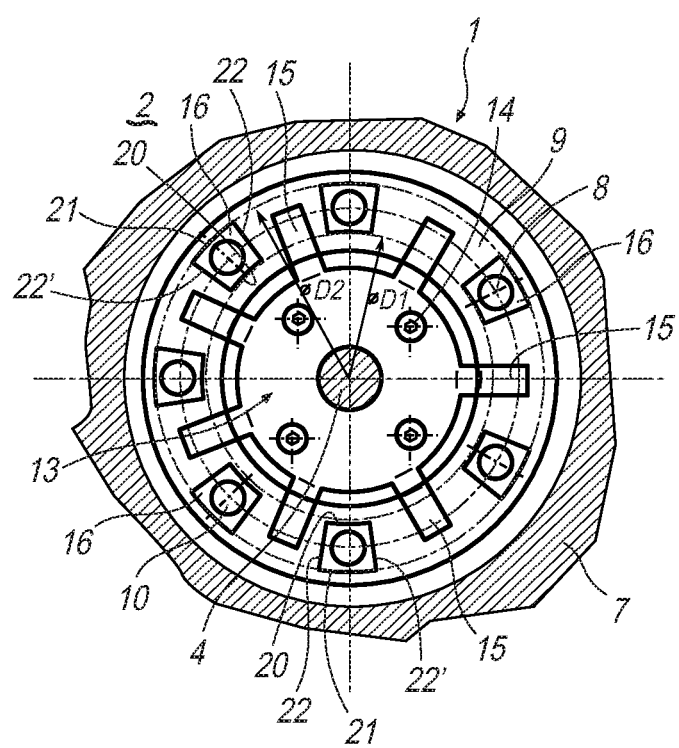
FIG. 6 shows an illustration as in FIG. 1, but in the case of sealing rings, which are embodied differently.

According to FIGS. 1, 2 and 6, an axial piston machine 1 according to the invention, which can for example be used in a heat recovery system 2 of a motor vehicle, which is not shown in detail, has a rotor 3 with a shaft 4. Cylinders 5, in which pistons 6 are arranged such that they can be moved translationally, are thereby arranged in an annular manner about and parallel to the shaft 4. Each cylinder 5 is hereby assigned an inlet opening 8 in a cylinder head 7. Provision is furthermore made for a sealing washer 9, which has a number of passage openings 10, which corresponds to the number of inlet openings 8, and which is arranged on the cylinder head 7 in such a way that the passage openings 10 and the inlet openings 8 are arranged flush with one another. To alternately apply a working medium to the individual cylinders 5, provision is made for a valve plate 11 (see also FIG. 3), which is connected to the shaft 4 in a rotationally fixed manner with a single valve opening 12, which can be brought into congruence with the individual passage openings 10 of the sealing washer 9 in a manner, which is dependent on the rotary angle. If the valve opening 12 is thereby flush with the passage openings 10 of the sealing washer 9, the working medium can be admitted into the corresponding cylinder 5 and the piston 6 can be moved with the help of the working medium. According to the invention, the sealing washer 9 is furthermore arranged between the inlet openings 8 and the valve plate 11 and is directly or indirectly prestressed against the cylinder head 7 by means of a holding-down device 13. The sealing washer 9 is prestressed onto the inlet openings 8 in the cylinder head 7 in the same way.

As mentioned, the sealing washer 9 can thereby be prestressed against the cylinder head 7 and onto the inlet openings 8 by means of a holding-down device 13, which is screwed to the cylinder head 7, or the sealing washer 9 is screwed directly to the cylinder head 7. In both cases, screws 14 are used for this purpose.

The prestressing of the sealing washer 9 against the cylinder head 7 and onto the inlet openings 8 provides the large advantage that the sealing washer 9 cannot lift off the cylinder head 7 and off the inlet openings 8, associated with the leakages resulting therefrom, even if the cylinder head 7 curves due to varying degrees of temperature expansions.

As the name already implies, the sealing washer 9 can be embodied as washer and can be screwed directly to the cylinder head 7 via the corresponding screws 14 in this case. As an alternative to this, it is also conceivable that the sealing washer 9 is configured in an annular manner, as it is embodied for example according to FIGS. 1, 2 as well as 4 and 5. In this case, the holding-down device 13, which has radial arms 15 (see FIG. 1), which are prestressed in the circumferential direction between the passage openings 10 against the sealing washer 9 and push the latter against the cylinder head 7, is used for prestressing. The holding-down device 13 can thereby be embodied as punched sheet metal part, which can be produced easily and cost-efficiently.

Irrespective of its embodiment, either in a plate-like or annular manner, the sealing washer 9 itself has sealing rings 16, which surround the respective passage openings 10 (see also FIGS. 1, 2 as well as 4 and 5), which, facing the valve plate 11, are in sliding contact with the latter. The valve plate 11 thus drags or slides across the sealing rings 16, respectively, during operation of the axial piston machine 1. The sealing washer 9 itself can thereby at least partially be embodied of a carbonaceous material 17, whereby it goes without saying that a complete embodiment of a carbonaceous material 17 is also conceivable. As an alternative to this, it is also conceivable that the sealing washer 9 is made of metal 18 and that the sealing rings 16 are made of the carbonaceous material 17, as it is illustrated for example according to FIG. 5. Again as an alternative, it goes without saying that the use of a plastic, in particular of a temperature and wear-resistant substance, such as for example polytetrafluoroethylene (PTFE) is conceivable instead of the carbonaceous material 17.

The sealing washer 9 as a whole can also be made of a metallic material, in particular of a Cu-based material comprising zinc and/or tin and/or lead, or of brass. As a whole, it can be present as cast workpiece or as semi-finished product, which is then processed.

Figure 3:
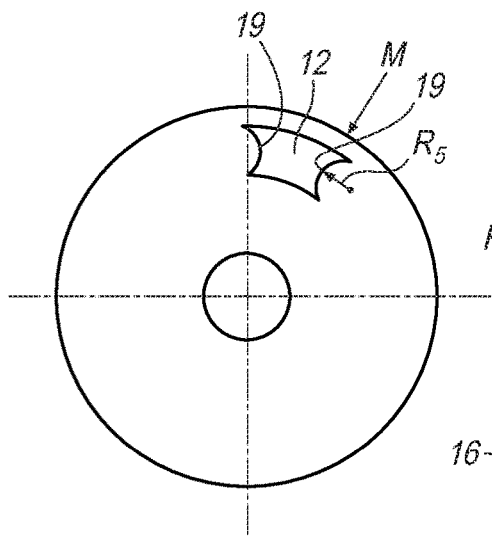
FIG. 3 shows a view onto a valve plate.
Figures 4, 5:
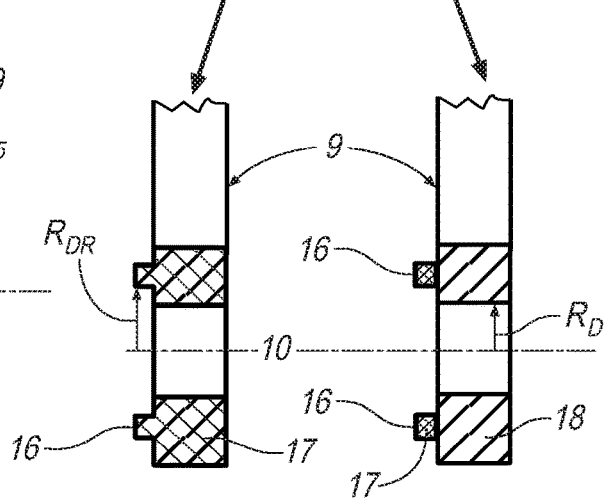
FIG. 4 shows a detailed illustration of a sealing washer from FIG. 2.
FIG. 5 shows an illustration as in FIG. 4, but in the case of a different sealing washer.

When also looking at FIGS. 3 and 4, it can be seen that the valve opening 12 is embodied in a ring segment-shaped manner and has convex side walls 19. It is a particular advantage thereby when a radius $R_s$ of the convex side walls 19 corresponds to a radius $R_D$ of the passage openings 10 or to a radius $R_{DR}$ of the sealing rings 16, respectively. Both embodiments thereby have in common that a comparatively quick, in particular even abrupt opening of the respective cylinder 5 as well as a quick or abrupt application, respectively, of the respective piston with working medium, can take place due to the convexly formed side walls 19.

The sealing rings 16 can also be produced by means of a lathing/milling (see FIG. 6), wherein an inner diameter D1 and an outer diameter D2 determine the lathing and thus determines an inner edge 20 and an outer edge 21 of the sealing ring 16. The two side edges 22, 22' are then created by means of milling. In this case, the sealing ring 16 does not have an annular shape in the actual sense, but a four-sided outer contour with the circular segment arc-shaped inner edge 20 and outer edge 21 and the side edges 22, 22', which run straight in the radial direction.

In the case of curvatures, which may appear in the area of the cylinder head 7, it can also be attained by means of the sealing washer 9, which is fixed to the cylinder head 7 in accordance with the invention that the sealing washer 9 bears tightly on the inlet openings 8, which is particularly advantageous for the efficiency of the axial piston machine 1, because it must not be feared that the sealing washer 9 lifts off the cylinder head 7, even in the case of a curved cylinder head 7. Due to the fact that the sealing washer 9 always bears tightly on the cylinder head 7, in particular leakages, which currently appear at that location when the cylinder head 7 curves, can be reliably avoided.

The invention claimed is:

1. An axial piston machine comprising:
   a rotor with a shaft;
   a plurality of cylinders arranged in an annular manner about the shaft;
   a plurality of pistons constructed and arranged to move translationally within the plurality of cylinders;
   a cylinder head having a plurality of inlet openings each leading into a corresponding one of the plurality of cylinders;
   a sealing washer having a plurality of passage openings disposed on the cylinder head so that the plurality of passage openings and the plurality of inlet openings are flush with one another, and wherein a number of the plurality of inlet openings corresponds to a number of the plurality of passage openings;
   a valve plate connected to the shaft in a rotationally fixed manner, the valve plate constructed and arranged to be brought into congruence with the plurality of passage openings of the sealing washer based on a rotary angle; and
   wherein the sealing washer is connected to the cylinder head in a rotationally fixed manner and disposed between the plurality of inlet openings and the valve plate and wherein the sealing washer is prestressed against the cylinder head and onto the plurality of inlet openings.

2. The axial piston machine according to claim 1, wherein the sealing washer is prestressed against the cylinder head and onto the plurality of inlet openings via at least one of a holding-down device secured to the cylinder head and securing the sealing washer directly to the cylinder head via screws.

3. The axial piston machine according to claim 1, wherein the sealing washer further includes a plurality of raised sealing rings facing the valve plate, the plurality of raised sealing rings surrounding each of the plurality of passage openings, and are arranged in sliding contact with each of the plurality of passage openings.

4. The axial piston machine according to claim 3, wherein the plurality of raised sealing rings include at least one of an annular shape and a four-sided outer contour with a circular segment arc-shaped inner edge, an outer edge, and straight side edges in a radial direction.

5. The axial piston machine according to claim 1, wherein the sealing washer is at least partially composed of at least one of a carbonaceous material and a polytetrafluoroethylene (PTFE).

6. The axial piston machine according to claim 4, wherein the sealing washer comprises a metal material and the plurality of raised sealing rings comprise at least one of a carbonaceous material and a polytetrafluoroethylene (PTFE).

7. The axial piston machine according to claim 1, wherein the sealing washer as a whole is composed of a metallic material.

8. The axial piston machine according to claim 2, wherein the holding-down device further includes a plurality of radial arms prestressed against the sealing washer in a circumferential direction between the plurality of passage openings, the plurality of radial arms constructed and arranged to push the sealing washer against the cylinder head.

9. The axial piston machine according to claim 1, wherein the valve plate further includes a valve opening, the valve opening having a ring segment-shape and including a plurality of convex side walls.

10. The axial piston machine according to claim 9, wherein a radius of the plurality of convex side walls corresponds to at least one of a radius of the plurality of passage openings and a radius of the plurality of raised sealing rings.

11. A heat recovery system of a motor vehicle, comprising:
an axial piston machine, the axial piston machine including:
a rotor including a shaft;
a plurality of cylinders arranged in an annular manner about the shaft;
a plurality of pistons arranged to move translationally within the plurality of cylinders;
a cylinder head having a plurality of inlet openings, wherein the plurality of cylinders are in operative communication with the plurality of inlet openings;
a sealing washer having a plurality of passage openings disposed on the cylinder head so that the plurality of passage openings and the plurality of inlet openings are flush with one another, and wherein a number of the plurality of inlet openings corresponds to a number of the plurality of passage openings;
a valve plate connected to the shaft in a rotationally fixed manner, the valve plate constructed and arranged to be brought into congruence with the plurality of passage openings of the sealing washer based on a rotary angle; and
wherein the sealing washer is disposed between the plurality of inlet openings and the valve plate and is prestressed against the cylinder head and onto the plurality of inlet openings.

12. The heat recovery system according to claim 11, wherein the sealing washer is prestressed against the cylinder head and onto the plurality of inlet openings via a holding-down device secured to the cylinder head, wherein the holding-down device connects the sealing washer to the cylinder head in a rotationally fixed manner.

13. The heat recovery system according to claim 11, wherein the sealing washer is prestressed against the cylinder head and onto the plurality of inlet openings via securing the sealing washer directly to the cylinder head.

14. The heat recovery system according to claim 11, wherein the sealing washer is composed of a metallic material.

15. The heat recovery system according to claim 11, wherein the sealing washer further includes a plurality of raised sealing rings facing the valve plate, the plurality of raised sealing rings arranged surrounding and in sliding contact with each of the plurality of passage openings.

16. The axial piston machine according to claim 1, wherein the sealing washer as a whole is composed of a brass material.

17. The axial piston machine according to claim 3, wherein the sealing washer comprises metal and the plurality of raised sealing rings comprise a polytetrafluoroethylene (PTFE).

18. The axial piston machine according to claim 4, wherein the plurality of raised sealing rings are formed via at least one of lathing and milling.

19. The axial piston machine according to claim 7, wherein the metallic material of the sealing washer is a copper-based material including at least one of zinc, tin and lead.

20. An axial piston machine comprising:
a rotor including a shaft;
a plurality of cylinders arranged in an annular manner about the shaft;
a plurality of pistons each positioned within each of the plurality of cylinders constructed and arranged to move translationally within the plurality of cylinders;
a cylinder head having a plurality of inlet openings, wherein the plurality of cylinders are in operative communication with the plurality of inlet openings;
a sealing washer having a plurality of passage openings and disposed on the cylinder head such that the plurality of passage openings and the plurality of inlet openings are flush with one another, and wherein a number of the plurality of inlet openings corresponds to a number of the plurality of passage openings;
a valve plate connected rotationally fixedly to the shaft, wherein the valve plate includes a valve opening constructed and arranged to be brought into congruence with the plurality of passage openings of the sealing washer based on a rotary angle;
a holding-down device secured to the cylinder head; and
wherein the sealing washer is disposed between the plurality of inlet openings and the valve plate and is prestressed against the cylinder head and onto the inlet openings via the holding-down device, and wherein the sealing washer further includes a plurality of raised sealing rings facing the valve plate, the plurality of raised sealing rings arranged surrounding and in sliding contact with each of the plurality of passage openings.

* * * * *